United States Patent [19]

Bauman et al.

[11] Patent Number: 4,833,205

[45] Date of Patent: May 23, 1989

[54] POLYMERIC MATERIALS HAVING CONTROLLED PHYSICAL PROPERTIES

[75] Inventors: Bernard D. Bauman, Coopersburg; Patricia E. Burdick, Whitehall; Rajendra K. Mehta, Allentown, all of Pa.

[73] Assignee: Air Products and Chemicals, Inc., Allentown, Pa.

[21] Appl. No.: 157,680

[22] Filed: Feb. 18, 1988

Related U.S. Application Data

[62] Division of Ser. No. 825,839, Feb. 4, 1986, Pat. No. 4,771,110.

[51] Int. Cl.⁴ .............................................. C08L 75/00
[52] U.S. Cl. ....................................... 525/123; 525/131; 525/332.3; 525/332.4; 525/356; 525/388; 525/454; 525/326.1
[58] Field of Search ....................... 525/130, 131, 326.1, 525/331.7, 331.8, 332.3, 332.4, 356, 388, 454, 123

[56] References Cited

U.S. PATENT DOCUMENTS

| | | | |
|---|---|---|---|
| 2,811,468 | 10/1957 | Joffre | 117/95 |
| 3,413,266 | 11/1968 | Saines et al. | 260/47 |
| 3,645,980 | 2/1972 | Bakor et al. | 525/131 |
| 3,663,469 | 5/1972 | Weissmahr et al. | 525/131 |
| 3,862,284 | 1/1975 | Dixon et al. | 264/83 |
| 3,897,386 | 7/1975 | Sanda | 525/131 |
| 3,940,520 | 2/1976 | Dixon et al. | 427/444 |
| 3,988,491 | 10/1976 | Dixon et al. | 428/288 |
| 3,992,221 | 11/1976 | Hemay et al. | 134/16 |
| 4,009,304 | 2/1977 | Dixon et al. | 427/322 |
| 4,020,223 | 4/1977 | Dixon et al. | 428/224 |
| 4,053,537 | 10/1977 | Ruprecht et al. | 525/131 |

FOREIGN PATENT DOCUMENTS

| | | | |
|---|---|---|---|
| 1720059 | 1/1978 | Fed. Rep. of Germany | 525/131 |
| 0201472 | 7/1983 | Fed. Rep. of Germany | 525/131 |
| 0090236 | 5/1985 | Japan | 525/131 |
| 1244971 | 9/1971 | United Kingdom . | |

*Primary Examiner*—John C. Bleutge
*Assistant Examiner*—A. Carrillo
*Attorney, Agent, or Firm*—Mark L. Rodgers; William F. Marsh; James C. Simmons

[57] ABSTRACT

Ground polymeric elastomer or other polymeric plastic, particularly from recovered scrap, is surface modified by treatment with a gaseous mixture containing a minor amount of fluorine and a larger amount of at leasts one reactive gas in an inert gaseous carrier. By the treatment the ground material is made more compatible for admixture with polyfunctional polymer-forming liquids, thereby obtaining novel composites of controlled physical properties. The other reactive gas is preferably oxygen or one of the gases from the group consisting of: chlorine and $SO_2$ with or without added oxygen.

4 Claims, No Drawings

POLYMERIC MATERIALS HAVING CONTROLLED PHYSICAL PROPERTIES

This is a division of application Ser. No. 825,839, filed Feb. 4, 1986, now U.S. Pat. No. 4,771,110.

FIELD OF THE INVENTION

The present invention relates to chemical treatment of polymers and is especially concerned with surface modification of these polymers by reaction with a mixture of gases including fluorine whereby the thus treated polymers can be mixed with polyfunctional polymer-forming liquids, thereby producing novel products having controllable physical properties.

BACKGROUND OF THE INVENTION

Among the problems confronting modern industry is the disposition of the large amounts of polymeric scrap materials generated, the major portion of which is not biodegradable nor easily separable into useful components. This is particularly true in the rubber tire industry, where despite the tremendously increasing piles of discarded tires year by year, no effective means have been designed to usefully recycle this material. The present invention, as hereinafter described, provides a practical and profitable outlet for the disposition of elastomer and other scrap from discarded polymeric materials as well as from trimmings and rejects of fabricating plants.

In addition to the foregoing problem for which the present invention offers a solution, it further extends the available processes for the production of composite plastics having unique combinations of physical properties. In the past such composites have been produced by mechanically blending or chemically bonding two or more polymers. For example, acrylonitrile-butadiene-styrene terpolymer (ABS) is produced by grafting polyacrylonitrile (a rigid polymer) onto polystyrene-butadiene (an elastic polymer). A common method for physically combining two materials into a composite is by blending. In this manner, for example, there is produced a blended composite of polybutylene terephthalate with polycarbonate (a very rigid material). However, the known chemical methods of making composite polymers require very precise control of processing conditions in order to produce products of desired uniform characteristics. The available physical alternatives, on the other hand, require good compatibility among the constituent materials to avoid phase separation, which limits the choice of polymers which can be thus combined with one another. It also virtually rules out the blends of highly elastomeric materials with rigid plastics because, most often, these are incompatible. Accordingly, industry is limited in the chemical and physical mixing of polymers to a relatively small number of these substances.

Yet another problem addressed by this invention is to convert a variety of polymeric scrap materials, such as used tires or polyester soda bottles, into useful materials. For want of better means for the disposition, industry has resorted to burning of scrap, which presents tremendous pollution problems, and even use of scrap in landfill is becoming more and more unacceptable.

In accordance with one aspect of the present invention, polymeric scrap materials and other polymers in a finely divided state are chemically modified at their surfaces to provide particles which can be incorporated and combined into a polymeric matrix to provide novel polymeric products of desirable controlled properties. Such chemical modification is effected by treatment of these particles under controlled conditions with fluorine in the presence of another reactive gas, as will hereinafter appear.

PRIOR ART

Surface fluorination of various polymeric materials has been described in the patent art as well as in other technical literature. The stated purposes of such fluorination vary considerably and in some instances appear to be inconsistent. The principal properties most often ascribed to result from the fluorination carried out under selected operating conditions are:

(a) improvement in water wicking and moisture transport properties of synthetic fibers and fabrics formed of polymeric plastics (U.S. Pat. Nos. 3,940,520; 3,988,491; 4,020,223);

(b) treatment of polyester yarns and cords to be incorporated in auto tires or other rubber goods (e.g. U.S. Pat. No. 4,009,304);

(c) treatment of natural and synthetic elastomers to improve lubricity, i.e., reduce surface friction (U.S. Pat. No. 3,389,098);

(d) to improve solvent resistance and/or reduce permeability of containers for organic fluid contents (UK No. 1,244,971; U.S. Pat. No. 2,811,469; U.S. Pat. No. 3,413,226; U.S. Pat. No. 3,992,221; U.S. Pat. No. 3,862,284).

Schonhorn, H. et al. (Journal of Applied Polymer Science, vol. 12, pp 1231–7; 1968) describe the surface fluorination of polyethylene to improve adhesive bonding.

SUMMARY OF THE INVENTION

In accordance with the present invention the starting polymer in finely ground condition is treated with a mixture of fluorine and at least one other reactive gas to effect chemical modification of the surface of the polymer. The treated polymer particles are thus made more compatible with, and thus may then be mixed more readily with, one or more polyfunctional polymer-forming liquids. In certain instances chemical reaction takes place at the surface of the treated particles between the chemically-modified particle and the liquid, and/or between such particle and the polymer formed in-situ between components of the polyfunctional liquids, thereby producing a new chemically-bonded polymeric material. By varying the relative proportions of the gas-treated particles and the polyfunctional liquids the properties of the ultimate polymeric material can be controllably fixed to suit desired end uses. Thus, the limitations heretofore encountered in physical blends of polymers, are largely overcome or avoided in practice of the present invention, since the active gas composition to be used in surface treatment of the starting polymer particles can be pre-selected so as to produce polymer particles compatible with the components of the subsequent liquid treating composition, thus avoiding the problem of phase separation.

DESCRIPTION OF PREFERRED EMBODIMENTS

The operable limits of the present invention are quite extensive from the standpoint of the polyfunctional liquids that can be employed as matrix for incorporation of the finely divided polymer, the source of the polymer particles and the composition of the gas employed in the treatment of these particles. Within these operable broad ranges, however, the ultimate products obtained will differ widely in physical properties and in the practical uses to which these various products can be adapted.

When polymeric materials are exposed to a mixture of gases containing elemental fluorine and another reactive gas or gases, among other reactions taking place, depending upon the nature of such other reactive gas, there are free radical reactions initiated by the fluorine. With the appropriate choice of the reactive gas or gases, desired functionalities can be provided at the surfaces of the treated polymer particles, whereby these are rendered more compatible with or will react with the polyfunctional liquid composition to form chemical bonding therebetween. Thus, a covalently bonded material is produced from two previously non-reacting materials.

In practice of the invention, the entire process of treating ground particles and mixing with polyfunctional liquids can be carried out in bulk phase and there is no need for preparation of solutions, as in the case of making blends or interpenetrating networks, or for emulsification of the components as is typically the case in graft polymerization. Depending upon the relative proportions of the polymer particles and the matrix or binder provided by the polyfunctional liquid composition, the properties of the resulting product can be readily varied generally to correspond largely to that approaching properties of the contained particles or that of the matrix or binder.

The finely divided polymeric particles employed in practice of the invention are obtained by grinding larger pieces or articles to desirable size employing cryogenic embrittlement if necessary or other available means known to the art. The "desirable size" of the powder particles is preferably that ranging from a few microns in diameter up to about a millimeter as determined by the end use of the formed composite. In some instances particles of up to several millimeter size in major dimension may be usefully employed. For most purposes, however, in which the best advantages of the present invention are obtained, the preferred particle size is that passing through a 60-mesh sieve (250 microns and finer).

The finely divided polymer particles are placed in a reactor and exposed to a reactive mixture of gases, one component of which is fluorine, together with one or more reactive gases and an inert diluent or carrier gas. The reaction is carried out under conditions such that the polymeric particles come in intimate contact with the gas mixture. This can be accomplished by using a rotating or tumbling reactor, fluidized bed or other suitable means.

After a predetermined period of exposure of the particles to the gas mixture, during which the surface composition of the particles is thus chemically modified, they are discharged from the reactor. The discharged particles are then mixed with a polyfunctional liquid composition made up of one or more liquids which will polymerize or co-polymerize and which may also be capable of reacting with other functionalities present at the surfaces of the chemically modified polymer particles. The term "liquid" as herein employed to designate the matrix or substrate in which the chemically surface-modified particles are incorporated, includes all fluid or thermoplastic compositions having functionalities which can react with acidic hydrogen functionalities, examples of such fluid or thermoplastic compositions include epoxide, isocyanate and carboxylic acid anhydride or a precursor which is hydrolyzable to carboxyl such as carbonyl fluoride.

While not limited thereto, the invention finds among its most important applications, the treatment of finely divided elastomeric particles such as natural or synthetic rubber including among these styrene-butadiene rubber (SBR), and polymer of ethylene-propylene diene monomer (EPDM). The invention is also applicable in treating finely divided common thermoplastics such as polyethylene terephthalate (PET) and polypropylene. By choice of the amount of ground polymer particles incorporated in the polymerized or polymerizable polyfunctional liquid, the properties of the ultimate product can be tailored as desired over a wide range comprising from 10 to 90% of the particles in the substrate or binder formed by the polyfunctional liquid. When the amount of ground polymer is in excess of that at which the resulting slurry becomes too viscous for stirring, a non-uniform product will be obtained.

Examples of suitable polyfunctional liquids useful in practice of the invention include: two component mixtures of appropriate organic isocyanates and polyols which react to form polyether polyurethanes, particularly in the presence of chain extenders. According to one embodiment, ground surface-modified elastomer particles (such as that obtained from scrap) can be exposed to a blocked MDI-based (methylene diphenyldiisocyanate) polyurethane and cured at high temperature. As the polyurethane cures, the diisocyanate will also react with the polymeric particles producing a composite.

The nature of the functionality or functionalities produced at the surface of the starting polymer particles will depend upon the composition of the active components of the gaseous treating composition. In the presence of elemental oxygen with the fluorine in the treating gas composition applied to the finely divided elastomeric or other polymeric particles, a fluorinated carboxylated layer is formed on the surface of the particles. The combined fluorine groups and the carboxylate groups are concentrated at the surfaces of the particles, within about 200 Å of the particle surface.

The treating gas composed of fluorine and oxygen as reactive components in an inert gas carrier, for the purpose of the present invention, should contain at least 1 ppm and up to about 25% by volume elemental fluorine, and 5 ppm to a maximum of 25% elemental oxygen. The molar ratio of $O_2/F_2$ in the treating gas is not critical and may be preferably in the range of 1:1000 to 200:1. The exposure of the particles to the treating gas should be for a time sufficient to incorporate into the surface layer of the particles from 5 to about 67% by number of fluorine and oxygen atoms, as determined by electron spectroscopy for chemical analysis (ESCA), also called XPS (X-ray photoelectron spectroscopy).

Instead of or in addition to oxygen accompanying the fluorine treating gas other reactive gases may be added, such as $Cl_2$, $SO_2$, $Br_2$, $BrCl_3$, $BrCl$, $CO$, and similar gases reacting to generate functional reactive sites in the particle surface layer.

Without being bound to any particular theory as to the nature of the chemical reaction mechanisms taking place, it is believed that when the ground polymer particles are exposed to the appropriate mixture of fluorine and another reactive gas, free radical reactions take place, initiated by the fluorine. By controlling the ratio of fluorine to the other reactive gas or gases, the particle surface can be made to predominate with the functionalities other than C-F i.e., fluoride functional sites and C-H. Thus, when using a mixture of $F_2$ and $O_2$ on a hydrocarbon polymer, the predominating functionalities are most likely to comprise carbonylimino, carboxylic, hydroxyl, carboxylic acid fluoride, and the like. These functionalities, as in the case of a polyurethane composition as the binder or matrix into which the surface-modified particles are incorporated, can react with either or both the isocyanate or polyol present in the polyurethane composition, while the isocyanate and polyol are interacting to form the polyurethane matrix. Thus, there is formed a new product with the matrix or binder being in the continuous phase containing the incorporated particles as the discrete phase. Even when there is no chemical bonding between the matrix and the modified particles, the functionalities such as carboxylic, hydroxyl, carboxylic acid fluoride, render most polymeric particles hydrophilic. This, in turn, causes the particles to be wetted much better with the binder matrix and provide superior physical compatibility between the two, resulting in a unique new product.

EXAMPLE 1

Ground EPDM rubber was treated under two different conditions:

(a) The ground EPDM having a particle size in the range of 150 to 850 microns (20 to 100 mesh) was treated with a gas mixture composed of (by volume) 1% fluorine, 40% sulfur dioxide and 59% nitrogen for thirty minutes, introduced at room temperature.

(b) Similar ground EPDM particles were treated with a gas mixture composed of (by volume) 1% fluorine, 16% oxygen and 83% nitrogen for 30 minutes.

Each batch of treated particles from (a) to (b) above was mixed with different amounts of a polyurethane formulation composed of

| | Parts by Weight (pbw) |
|---|---|
| Methylene diphenyl di-isocyanate (MDI) | 100 |
| 1,4 Butanediol | 7.7 |
| DABCO LV ® Amine catalyst | 0.25 |

Tensile strength and elongation at break were measured for each of the composited products and compared with a control containing the untreated ground rubber particles. The results are reported in Table 1.

TABLE 1

| | CONTROL | | Treatment (a) | | Treatment (b) | |
|---|---|---|---|---|---|---|
| EPDM wt % | Tensile str. at break (lbs) | Elongation at break (%) | Tensile str. at break (lbs) | Elongation at break (%) | Tensile str. at break (lbs) | Elongation at break (%) |
| 25 | 434 | 235 | 474 | 227 | 624 | 259 |
| 40 | — | — | 464 | 196 | 681 | 278 |
| 50 | 326 | 142 | 389 | 165 | 574 | 273 |

From the results reported in Table 1, it is seen that by treatment of the ground particles in accordance with the invention much superior tensile strength is obtained and in most instances considerably higher elongation at break.

EXAMPLE 2

Scrap PET soda bottles were ground and one portion of the ground particles subjected to treatment (c) by fluoro-chloro-oxidation; the other portion (untreated) serving as a control. The fluoro-chloro-oxidation referred to was carried out in two steps of 15 minutes each, employing a treating gas composed of (by volume) 50% $Cl_2$, 1% $F_2$, 40% air, 9% $N_2$. Each of these particle portions was incorporated in indicated amounts in a polyurethane formulation comprising:

| | pbw |
|---|---|
| 1,4 butanediol | 7.7 |
| Polyurethane prepolymer (7.53% free isocyanate) | 100. |
| DABCO LV ® Amine catalyst | 0.25 |

The results are reported in Table 2.

TABLE 2

| | Untreated (Control) | | Treatment (c) | |
|---|---|---|---|---|
| PET wt % | Tensile Strength @ Break (psi) | Tensile Tear (psi) | Tensile Strength @ Break (psi) | Tensile Tear (psi) |
| 20 | 2030 | 478 | 2718 | 658 |
| 35 | 1082 | 286 | 1812 | 391 |

EXAMPLE 3

Rubber tire scrap (predominantly a blend of SBR and butadiene rubber) (SBR) was ground and one portion of the ground particles treated for 30 minutes with a gas composition (D) composed of (by volume) 40 parts $SO_2$ and 1 part $F_2$ in $N_2$ (59 parts); the other portion of the ground particles was left untreated as a control.

Each of the portions was incorporated in a polyurethane prepolymer formulation consisting of Solukast and MOCA*. The compared results are reported in Table 3 below:

TABLE 3

| Composition | Tensile strength @ break (psi) | Elongation @ break (%) | Tensile strength @ 100% elong, (psi) |
|---|---|---|---|
| PU (no additives) | 1226 | 151 | 978 |
| PU + 40% (wt) untreated SBR | 1593 | 523 | 723 |
| PU + 40% (wt) treated SBR | 2244 | 447 | 777 |

*MOCA is 4.4 methylene bis(2-chloraniline) and Solukast is a trademark for the reaction product of a polyether with toluene diisocyanate (4.1% free isocyanate). The polyurethane formulation comprised of 90 pbw of Solukast and 10 pbw of MOCA.

In each of the foregoing runs of Examples 2 & 3, as was the case in that of Example 1, there was a significant improvement in physical properties of the products containing the treated ground polymer as compared with the untreated control.

EXAMPLE 4

Another series of runs was carried out incorporating into PU formulation respectively 10%, 20% and 35% of scrap PET untreated particles as well as particles treated under various conditions as reported below:

(a) PET particles were treated with a gas mixture comprising 2% $F_2$, 16% $O_2$ and 82% $N_2$ (by volume) for a period of 15 minutes. After the first treatment, gases were evacuated completely and exactly the same treatment was repeated. This treatment is identified as FO (for fluoro-oxidate below).

(b) PET particles were treated with a gas mixture comprising of 1% $F_2$, 8% $O_2$, 50% $Cl_2$ and 49% $N_2$ (by volume) for 15 minutes. As in the above example the same treatment was repeated after gas evacuation. The treatment is identified as FCO (for fluorochloro-oxidation).

TABLE 4

| Treatment | Tensile Strength (psi at) wt % Particles | | | Tensile Tear (psi at wt % Particles | | |
|---|---|---|---|---|---|---|
| | 10% | 20% | 35% | 10% | 20% | 35% |
| Control | 2188 | 1974 | 1013 | 576 | 503 | 294 |
| FO | 2550 | 2166 | 1406 | 703 | 568 | 324 |
| FCO | 2370 | 1973 | 1238 | * | * | * |

*Data not available.

It has been previously observed that in certain polymerization reactions, as for example in the production of polyurethanes, that the presence of acid functionality hinders curing of the polymers, as a result of tying up the amine catalyst employed and/or by reacting with the isocyanate. A series of runs was conducted, as hereinafter described, to determine the effect of neutralizing the ground polymer particles following their treatment with acidic gases, prior to incorporation of the treated particles into a matrix comprising a polyurethane formulation. In the runs herein described, ammonia was employed as the neutralizing agent for convenience, although alkaline media may be similarly employed.

EXAMPLE 5A (a) Polypropylene was ground to powder (40 to 60 mesh predominant particle size) and subjected to successive treatment for ten minutes each with gas comprised of fluorine with oxygen as set out in Table 5 below.

(b) A portion of the treated particles from (a) above were exposed to gaseous $NH_3$ for 5 minutes.

(c) Another sample of the polypropylene particles was treated for 30 minutes with a gas mixture comprising 0.8% $F_2$ and 60% $SO_2$.

(d) A portion of the treated particles from (c) above was afterward exposed for five minutes to ammonia gas.

(e) As a control untreated polypropylene particles were exposed for five minutes to $NH_3$ gas.

The foregoing treatments and conditions are tabulated in Table 5 and the results of the treatment set out in Table 6.

TABLE 5

| Treatment | Mixture I.D. | Reaction Conditions | | | |
|---|---|---|---|---|---|
| | | Gas Composition (vol. %) | | | |
| | | $O_2$ | $F_2$ | $SO_2$ | Time (min.) |
| (a)* | FO | — | — | — | |
| | | 14.7 | 2.4 | 0 | 10 |
| | | 10.1 | 3.2 | 0 | 10 |
| | | 6.3 | 5.6 | 0 | 10 |
| (b) | FO/$NH_3$ | [Same as (a) + $NH_3$] | | | |
| (c) | $FSO_2$ | 0 | 0.8 | 60 | 30 |
| (d) | $FSO_2$/$NH_3$ | [Same as (c) + $NH_3$] | | | |
| (e) | $NH_3$ | $NH_3$ only | | | 5 |

*Reaction vessel was completely evacuated of all gases between each 10 minute treatment to ensure gas composition for the subsequent step.

EXAMPLE 5(B)

Each of the treated samples from Example 5A above was incorporated into a polyurethane formulation comprising 90 parts by weight of methylene diphenyl diisocyanate and 7.7 parts of 1,4-butanediol, employing respectively 20%, 35% and 45% of the particles by weight of the polyurethane-formulation. The physical properties of some of the samples were measured and compared results are reported in Table 6 below.

TABLE 6

| (i) Treatment | Ultimate Tensile Strength (psi) @ 45% Particle Loading | Ultimate Elongation (%) @ 45% Particle Loading |
|---|---|---|
| $NH_3$ only | 860 | 22 |
| $FSO_2$ | 684 | 12 |
| $FSO_2$ + $NH_3$ | 988 | 38 |

| (ii) Treatment | Tensile Strength (psi) @ 100% Elongation |
|---|---|
| $NH_3$ only | 1223 |
| FO | 2147 |
| FO + $NH_3$ | 2247 |

EXAMPLE 6

(a) Polyethylene terephthalate (PET) scrap was ground to powder (24% passing through 60 mesh screen, 68.8% through 40 mesh) and treated with a gas mixture consisting of 1% by volume fluorine, 40% by volume chlorine, and 59% by volume nitrogen for a period of 15 minutes. The treatment was done twice successively with complete gas evacuation between the treatments.

(b) Some of the particles from the above sample were exposed to gaseous ammonia for a period of 15 minutes.

Samples from (a) and (b) were taken and incorporated in a polyurethane formulation. The PU formulation comprised of 80 pbw MDI, 7 pbw 1,4-butanediol (82–95% NCO/OH) with 0.15 pbw triethylenediamine as catalyst. Twenty percent by weight of the powders from (a) and (b) above were incorporated into the PU formulation. The physical properties are reported below.

TABLE 7

| Sample | Tensile Strength psi | Elongation at break % | Tear Str. psi |
|---|---|---|---|
| Fluorochlorinated (unneutralized) | 1625 | 58 | 312 |
| Fluorochlorinated ($NH_3$ neutralized) | 2310 | 68 | 560 |

EXAMPLE 7

In order to examine the effect of alkaline neutralization on elastomeric particles, ground EPDM and scrap tire rubber (predominantly a blend of butadiene rubber and SBR) were treated individually under several conditions. The conditions were: (a) 1% $F_2$, 18% oxygen, 81% $N_2$ for 30 minutes (FO); (b) 1% $F_2$, 40% $Cl_2$ and 59% $N_2$ for 30 minutes (FC); and (c) 1% $F_2$, 40% $SO_2$, 59% $N_2$ for 30 minutes (FS). A portion of each of the above samples was neutralized with ammonia by exposing it to $NH_3$ for 15 minutes.

Each of the above samples was made into a composite with a polyurethane formulation comprising 80 pbw MDI, 7 pbw 1,4-butanediol and 0.15 pbw triethylene diamine catalyst.

In each case, 20% by weight of the ground elastomer was added to 80% by weight of the PU formulation. Physical properties of the composites were measured and are tabulated below:

TABLE 8

| | EPDM | | | TIRE RUBBER | | |
|---|---|---|---|---|---|---|
| Treatment | Ult. Tens. Str. (psi) | Tens. Str. @ 100% Elong. (psi) | Tensile Tear Str. (psi) | Ult. Tens Str. (psi) | Tens. Str. @ 100% Elong. (psi) | Tensile Tear Str. (psi) |
| FO | 2840 | 1082 | 469 | * | * | * |
| FO + $NH_3$ | 3494 | 1327 | 512 | * | * | * |
| FC | 1886 | 1368 | 514 | 2218 | 1450 | * |
| FC + $NH_3$ | 1977 | 1485 | 555 | 2334 | 1466 | * |
| FS | 3317 | 1327 | 542 | * | 1307 | 537 |
| FS + $NH_3$ | 3405 | 1362 | 531 | * | 1374 | 608 |

*These samples were not evaluated.

As seen from the results reported in Examples 5 through 7, alkaline neutralization of treated particles is beneficial in most cases in enhancing the physical properties of the composite.

Examples of suggested gaseous treating compositions that can be employed in practice of the invention are tabulated in Table 9 below:

TABLE 9

| | Composition (by volume) | | | |
|---|---|---|---|---|
| | Range | | Preferred Range | |
| Component | | | | |
| $F_2$ | 1 ppm | 25% | 100 ppm | 10% |
| $O_2$ | 5 ppm | 25% | 0.1 | 20% |
| $Cl_2$ | 0 | 90% | 0 | 50% |
| $SO_2$ | 0 | 75% | 0 | 50% |

While the choice of size ranges of the treated polymer particles can be selected from rather wide limits, the favored particle size will depend upon the system and physical properties of interest. For example, impact may be enhanced by incorporation of particulate material of very small size range, as in the order of one to several microns, whereas it is postulated that improved abrasion resistance may be had by using larger sized particles.

While in the specific examples set out above in detail, the polyfunctional liquid matrix described is a polyurethane formulation, it will be understood that other polyfunctional polymer-forming liquid compositions can be similarly used in practice of the present invention. Representative examples include: solutions containing terephthalic acid chloride and a polyfunctional glycol, a low molecular weight epoxy combined with a polyfunctional amine, hexamethylene diamine combined with adipyl chloride, etc.

It is a common practice in the industry to add to polymers, especially elastomers, materials such as fillers, extenders, lubricants, etc. Some of these materials have a tendency to "bloom" to the surface, which reduces the efficacy of the gas-phase reaction with the particles.

In accordance with the above observations, experiments were carried out to maximize the efficiency of gas-phase reaction with elastomeric particles. Chunks of rubber from scrap automobile tires (predominantly blends of SBR and butadiene rubber) were cryogenically ground to particles with sizes between 40 and 60 mesh. A portion of the ground particles was washed with methylene chloride in Soxhlet Extraction apparatus for a period of 3 hours.

Polyurethane and rubber composites, using washed and unwashed rubber particles were prepared and their physical properties tested as follows:

EXAMPLE 8

(A) Samples of washed and unwashed ground rubber were treated individually in a reactor using a gas mixture containing 3% $F_2$, 14% $O_2$ and 83% $N_2$ (by volume) for a period of 15 minutes. These samples were mixed individually with 80% by weight of PU formulation consisting of: 80 gms. M400 Adiprene prepolymer, 7 gms. 1,4-butanediol, and 0.15 gms. Dabco LV® amine catalyst. Tensile properties were noted as follows:

| | Tensile @ 100% Elong. (psi) | Tensile @ Break (psi) |
|---|---|---|
| FO | 2,821 | 1,232 |
| Wash + FO | 3,234 | 1,447 |

(B) The above procedure was repeated with the particles treated with a gas mixture consisting of 1% $F_2$, 40% $Cl_2$, 10% $O_2$, and 49% $N_2$ for a period of 30 minutes.

The results are:

| | Tensile Strength @ 100% Elong. (psi) | Tensile Tear Strength (psi) |
|---|---|---|
| FOC | 1,200 | 492 |
| Wash + FOC | 1,295 | 494 |

From the above examples, it is clear that washing of elastomeric ground particles with an appropriate solvent prior to the surface modification results in more desirable properties.

What is claimed:

1. A composition of matter prepared by surface treating styrene-butadiene rubber material, in finely divided form, with a gaseous medium comprising fluorine and a reactive gas selected from the group consisting of $Cl_2$, $SO_2$, $Br_2$, $BrCl_3$, $BrCl$, $CO$ and mixture thereof, under conditions sufficient to chemically modify the surface of said styrene-butadiene rubber material, and subsequently incorporating said treated material into a matrix or binder material formed from a polyurethane-forming liquid.

2. A composition in accordance with claim 1 wherein said styrene-butadiene material comprises from 10-90 wt% of the total composition.

3. A composition in accordance with claim 1 wherein said polyurethane-forming liquid contains isocyanate functionalities.

4. A composition in accordance with claim 3 wherein said isocyanate functionalities have been chemically reacted with the treated surfaces of the styrene-butadiene material.

* * * * *